(12) United States Patent
Berger et al.

(10) Patent No.: US 7,736,121 B2
(45) Date of Patent: Jun. 15, 2010

(54) TORTILLA DESTACKING DEVICE

(75) Inventors: Thomas G. Berger, Ridgefield, NJ (US); Moysey Shtilerman, Elmwood Park, NJ (US); Kenneth L. Schmidt, Succasunna, NJ (US)

(73) Assignee: Solbern LLC, Fairfield, NJ (US)

( * ) Notice: Subject to any disclaimer, the term of this patent is extended or adjusted under 35 U.S.C. 154(b) by 335 days.

(21) Appl. No.: 11/973,108

(22) Filed: Oct. 4, 2007

(65) Prior Publication Data
US 2009/0092475 A1    Apr. 9, 2009

(51) Int. Cl.
*B65H 3/08*    (2006.01)
*B65G 59/06*    (2006.01)

(52) U.S. Cl. .............. 414/797; 414/797.7; 271/105; 271/270

(58) Field of Classification Search ........... 101/389.1, 101/477; 271/107, 108, 14, 276, 99; 414/790.2, 414/796.9, 797, 797.1, 797.2, 797.3, 797.4, 414/797.6, 797.7, 797.8; 221/215
See application file for complete search history.

(56) References Cited

U.S. PATENT DOCUMENTS

| | | | | |
|---|---|---|---|---|
| 626,676 | A | * | 6/1899 | Crowell ............... 271/109 |
| 769,747 | A | * | 9/1904 | Hoag ................. 271/101 |
| 1,071,928 | A | | 9/1913 | Koerner |
| 1,072,397 | A | | 9/1913 | Koerner |
| 2,770,458 | A | * | 11/1956 | Halahan et al. ........ 271/99 |
| 3,185,472 | A | | 5/1965 | Rubow |
| 3,372,924 | A | | 3/1968 | Treff |
| 3,702,187 | A | * | 11/1972 | Hageman et al. ...... 271/101 |
| 3,893,664 | A | | 7/1975 | Thomsen |
| 3,998,449 | A | | 12/1976 | Hornung |
| 4,042,235 | A | | 8/1977 | Wanner |
| 4,070,015 | A | * | 1/1978 | Muka ................. 271/100 |
| 4,269,405 | A | | 5/1981 | Mitzel |
| 4,359,214 | A | | 11/1982 | Eldrige |
| 4,359,216 | A | * | 11/1982 | Leonard ............... 271/107 |

(Continued)

FOREIGN PATENT DOCUMENTS

WO    WO 2009/045806 A1    4/2009

OTHER PUBLICATIONS

International Search Report of the International Searching Authority, mailed Dec. 4, 2008, issued in connection with International Patent Appl. No. PCT/US08/77469 (2 pages).

(Continued)

*Primary Examiner*—Gregory W Adams
(74) *Attorney, Agent, or Firm*—McCarter & English, LLP

(57) ABSTRACT

Disclosed herein is a destacking device for dispensing planar food products, such as tortillas, from a stack bottom. In some embodiments of the invention, the device includes a frame and a carriage assembly configured for linear reciprocation with respect to the frame. The carriage assembly has a drum that rotates in response to linear reciprocation of the carriage assembly, and a suction lip is positioned proximal a wall of the drum. A stack of tortillas can be disposed on the suction lip, and a negative pressure is applied to close the suction lip and "suck" a bottommost tortilla against the lip. A movable arm has a leading edge for cooperating with the suction lip to separate the bottommost tortilla from a next bottommost tortilla. The drum rotates the suction lip and tortilla, and the vacuum is released to allow the tortilla to fall downwardly onto an endless belt.

17 Claims, 18 Drawing Sheets

U.S. PATENT DOCUMENTS

| | | |
|---|---|---|
| 4,516,487 A | 5/1985 | Madison et al. |
| 4,526,359 A | 7/1985 | Garavuso |
| 4,608,919 A | 9/1986 | Prows et al. |
| 5,028,043 A | 7/1991 | Karolyi |
| 5,064,341 A | 11/1991 | Pippin |
| 5,161,937 A | 11/1992 | Pippin |
| 5,263,407 A | 11/1993 | Pomara, Jr. |
| 5,326,219 A | 7/1994 | Pippin et al. |
| 5,397,214 A | 3/1995 | Cheung |
| 5,407,317 A | 4/1995 | Pippin et al. |
| 5,494,398 A | 2/1996 | Montemayor et al. |
| 5,531,156 A | 7/1996 | Brummett |
| 5,673,908 A * | 10/1997 | Nagata et al. .............. 271/11 |
| 5,857,829 A | 1/1999 | Achelpohl |
| 5,912,035 A | 6/1999 | Grat |
| 5,934,866 A | 8/1999 | Redden |
| 6,168,370 B1 | 1/2001 | Longoria et al. |
| 6,634,483 B1 | 10/2003 | Longoria |
| 2006/0107846 A1 | 5/2006 | Foulon, Jr. et al. |
| 2006/0144254 A1 | 7/2006 | Foulon, Jr. et al. |

OTHER PUBLICATIONS

Written Opinion of the International Searching Authority, mailed Dec. 4, 2008, issued in connection with International Patent Appl. No. PCT/US08/77469 (6 pages).

* cited by examiner

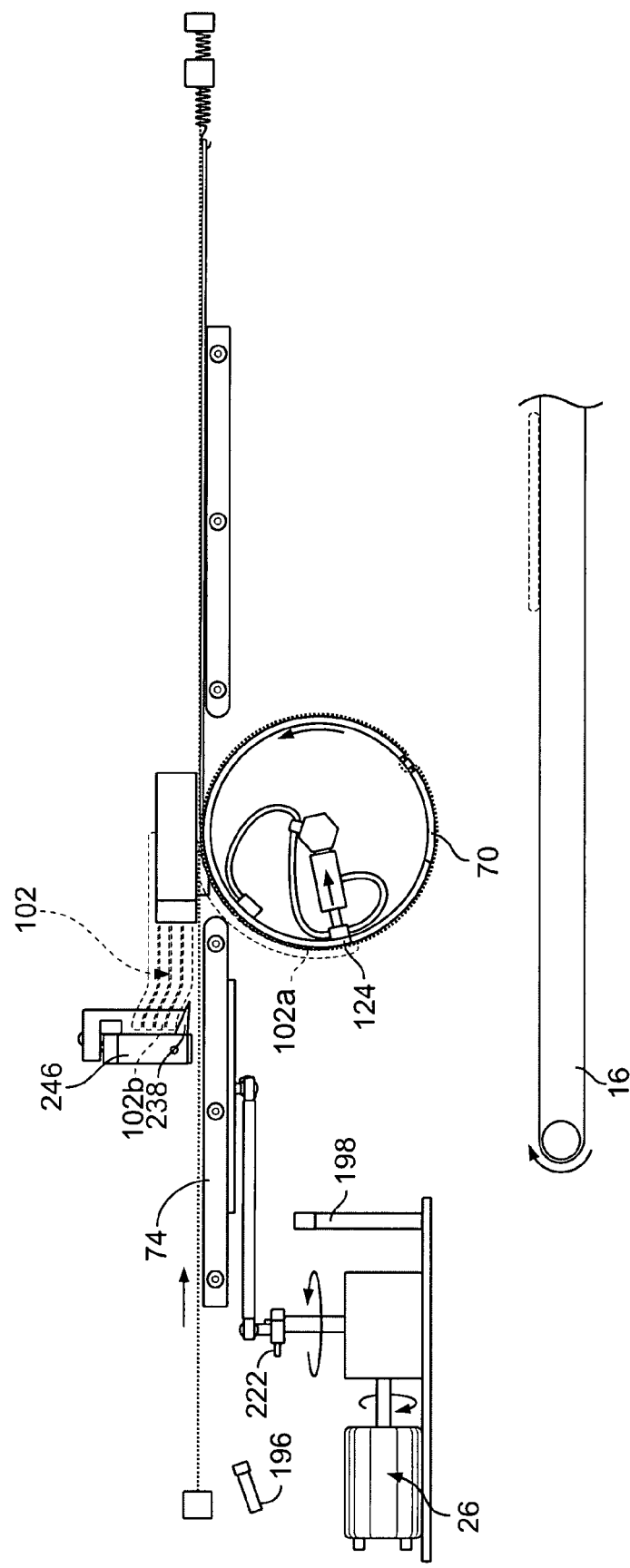

TORTILLA DESTACKING DEVICE

FIELD OF THE INVENTION

The present invention relates generally to a machine for destacking planar food products, and, more particularly, to an apparatus for dispensing tortillas from a bottom of a stack thereof onto a food processing assembly line.

BACKGROUND OF THE INVENTION

Devices are known in the art for removing food product from the top of a stack thereof. However, because a stack needs to be replenished as product is removed from the top, such devices can present operational inefficiency, as it is difficult to replenish the stack while the machine engages the stack. More particularly, a user of a top-side destacker must often deactivate the top-side destacker before replenishing the stack, thereby resulting in device down-time What is needed in the art is a device for efficiently separating and dispensing planar food products, such as tortillas, from the bottom of a stack thereof.

SUMMARY OF THE INVENTION

The present invention overcomes the disadvantages and shortcomings of the prior art by providing a destacking device for dispensing planar food products, such as tortillas, from a stack bottom. A destacking device constructed in accordance with an exemplary embodiment of the present invention includes a carriage assembly configured for linear reciprocation along a frame and having a drum that rotates in response to the linear reciprocation of the carriage assembly. A suction lip is disposed proximal a wall of the drum and has a hole at which a negative pressure can be applied through a vacuum assembly. When the drum is in a first position, a negative pressure is applied to close the suction lip and draw a bottommost food product of the stack against the suction lip. The drum rotates to a second position, and the negative pressure is released to open the suction lip and allow the bottommost food product to fall in a generally downward direction upon a structure, such as the platform of a food processing machine, an assembly line, or another suitable structure. A pivoting arm can be provided with a base secured to the frame and a leading edge opposite the base, such that, when the suction lip is in the closed position and the drum is in the first position, an arm has pivoted with the leading edge in an engagement position. In the engagement position of some embodiments of the invention, the leading edge cooperates with the suction lip to separate the bottommost planar food product from the next bottommost food product in the stack.

Additional features, functions and benefits of the destacking device will be apparent from the detailed description which follows, particularly when read in conjunction with the accompanying figures.

BRIEF DESCRIPTION OF THE DRAWINGS

For a more complete understanding of the present invention, reference is made to the following detailed description of an exemplary embodiment considered in conjunction with the accompanying drawings, in which:

FIGS. 12A-12F are schematic elevational views with sections of the frame and carriage assembly broken away to show operation of the destacking device, the destacking device being shown in combination with the portable food processing assembly line of FIG. 1.

DETAILED DESCRIPTION OF THE EXEMPLARY EMBODIMENT

Figure 1:
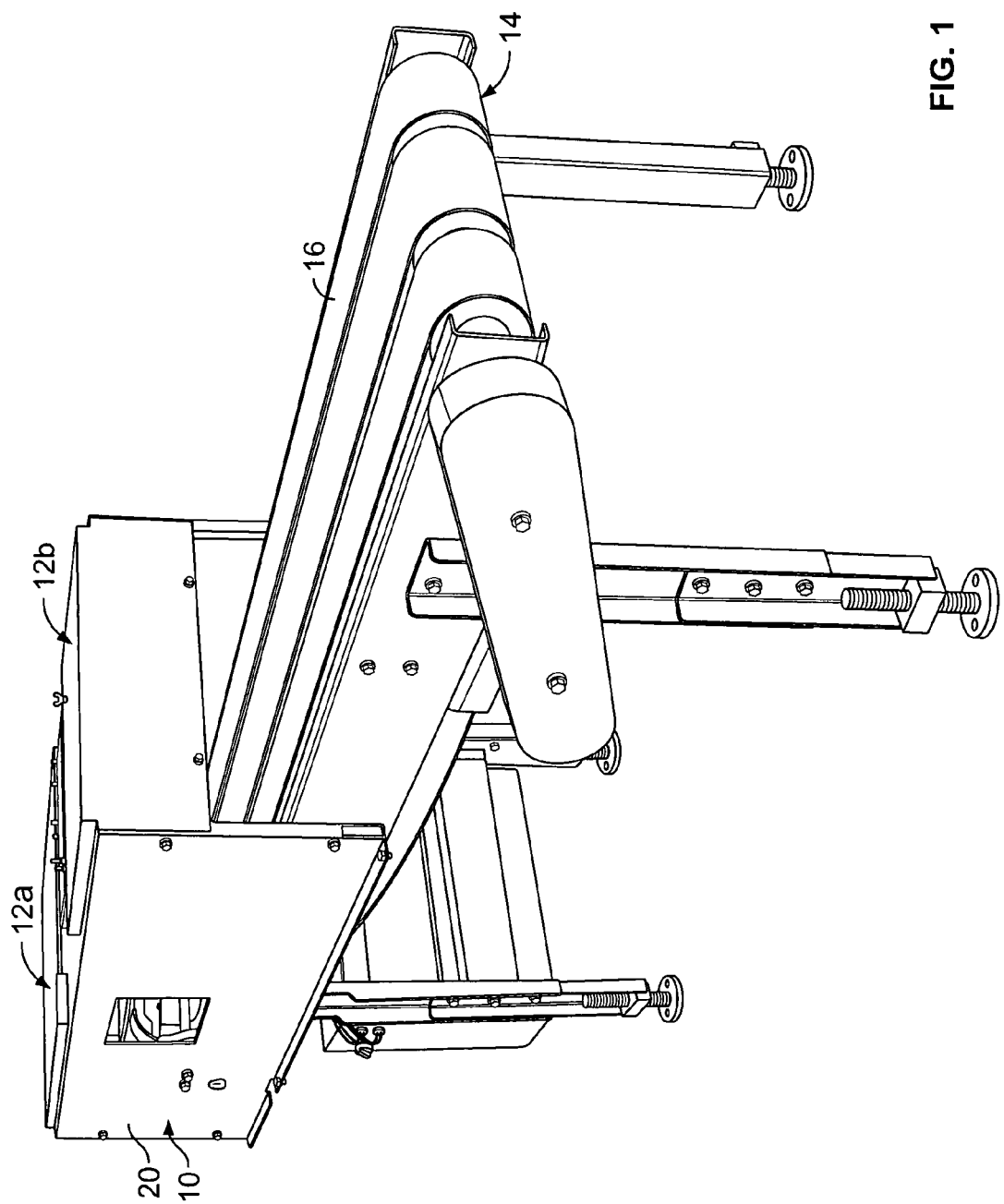
FIG. 1 is a left side perspective view showing a destacking device constructed in accordance with an exemplary embodiment of the invention, the destacking device being shown in combination with a safety cover and a portable food processing assembly line.
Figure 2:
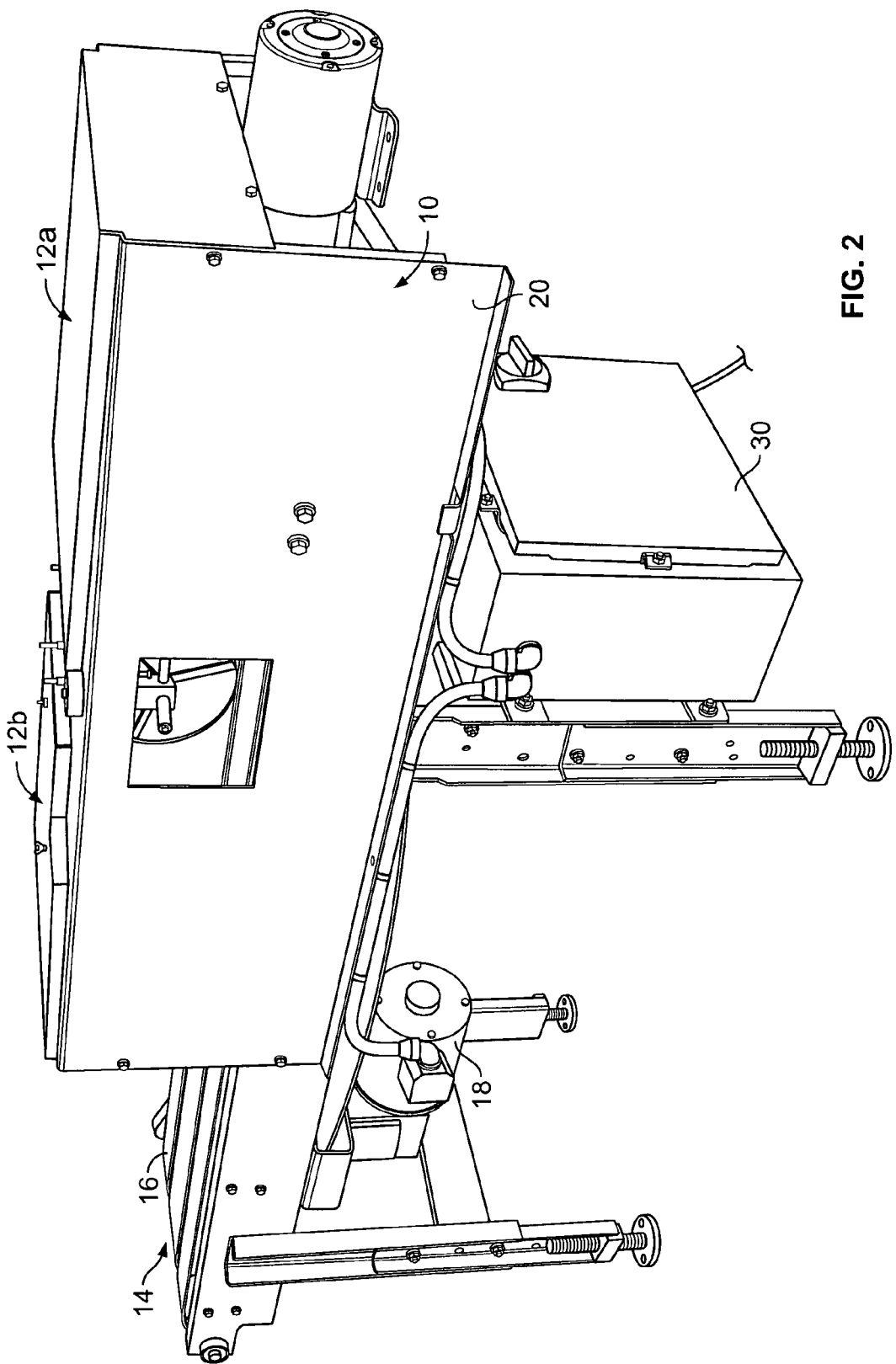
FIG. 2 is a right side perspective view of the combination of FIG. 1.

Referring to FIGS. 1 and 2, a destacking device 10 constructed in accordance with an exemplary embodiment of the invention is shown. The destacking device 10 can be provided with a plurality of safety covers 12a, 12b, and can be used in combination with any suitable food processing machine, such as a device or plurality thereof for filling and/or folding tortillas. As an example, the destacking device 10 is shown in combination with and mounted to a portable food processing assembly line 14 that includes an endless belt 16 and a belt motor 18 therefor. Though further reference is made herein to the portable food processing assembly line 14 of FIG. 1, it shall be understood that the destacking device 10 can be used in combination with any suitable device for receiving planar food products dispensed from the destacking device 10, such as the platforms found on tortilla folding devices. Furthermore, it shall be understood that the destacking device 10 can be mounted to such device and/or the destacking device 10 can be provided with independent means for providing support, such as a plurality of legs, braces, etc.

Figure 3:
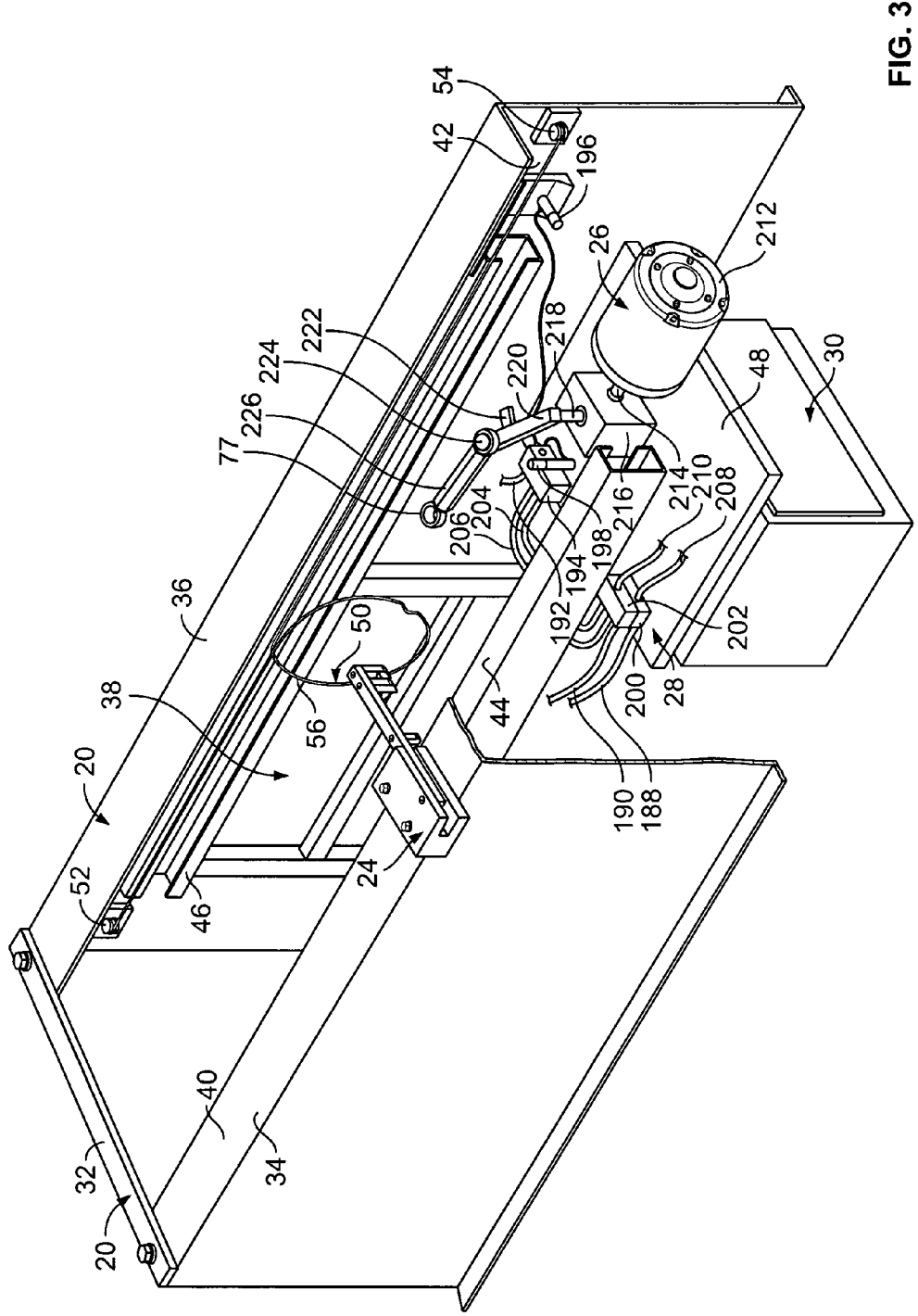
FIG. 3 is a left side perspective view showing components of the destacking device of FIG. 1 including a frame, an arm assembly, a drive assembly, a vacuum assembly, and an electric control assembly, the frame being shown with a plurality of carriage brackets and a cable assembly.
Figure 4:
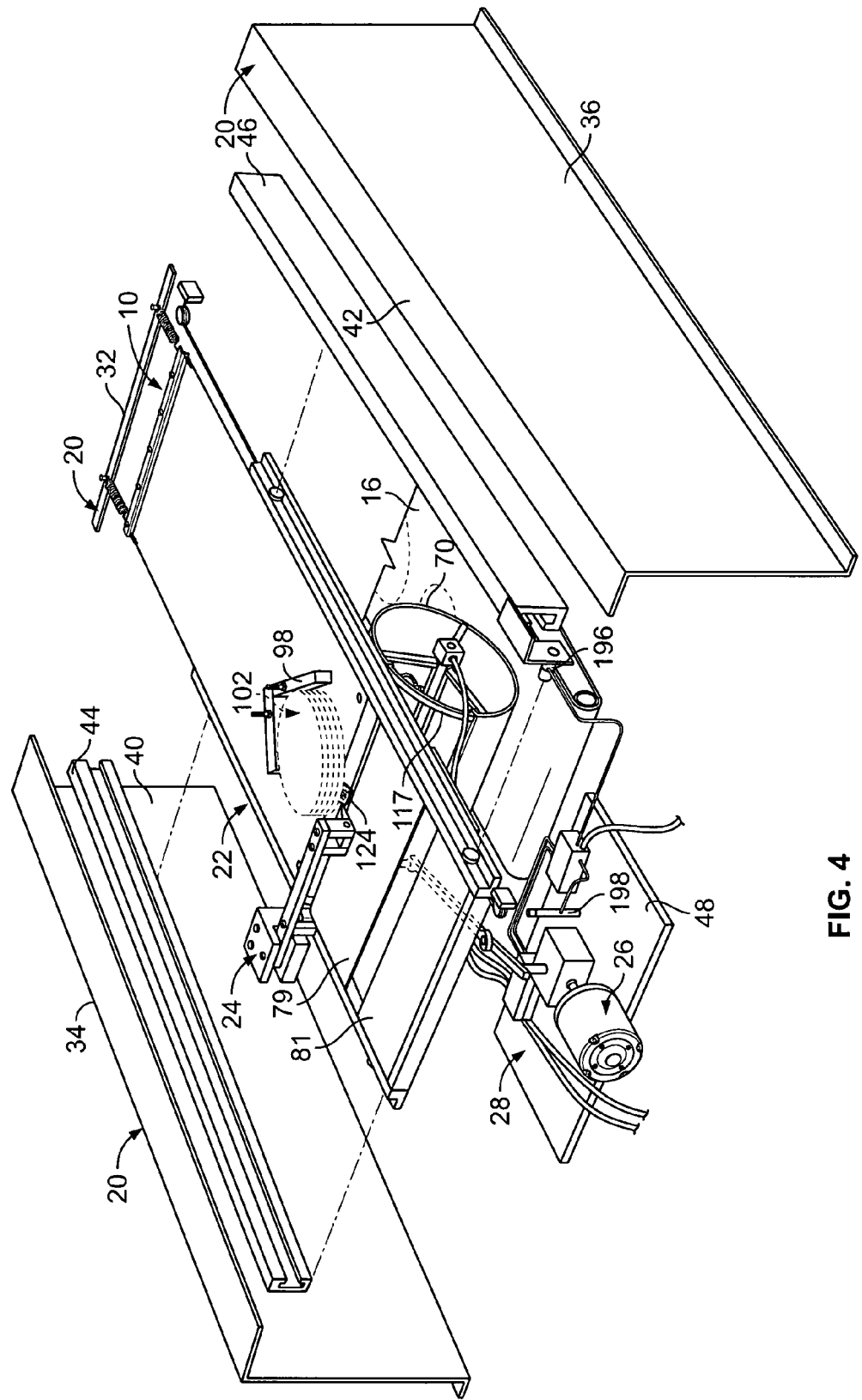
FIG. 4 is a partially exploded right side perspective view showing components of FIG. 3 with a carriage assembly movably mounted to the carriage brackets, the carriage assembly being shown to include a first belt assembly, a drum and drum axle therefor, mounting blocks for the drum axle, a second belt assembly, and an alignment device.

Referring to FIGS. 3 and 4, it is shown that the destacking device 10 is provided with a frame 20, a carriage assembly 22 supported by the frame 20, an arm assembly 24 for separating planar food product on the carriage assembly 22, a drive assembly 26 for imparting linear motion to the carriage assembly 22, a vacuum assembly 28 for delivering and releasing a vacuum at a drum 70 of the carriage assembly 22, and an electric control assembly 30 for controlling the drive assembly 26 and the vacuum assembly 28 (and, in some embodiments, the belt motor 18 of the portable food processing assembly line 14). Each one of the frame 20, the carriage assembly 22, the arm assembly 24, the drive assembly 26, the vacuum assembly 28, and the electric control assembly 30 shall be discussed with further detail below.

The frame 20 includes an end frame member 32 and a plurality of opposing side frame members 34, 36 extending perpendicularly from the end frame member 32. The frame members 32, 34, 36 define an open interior 38 therebetween for receiving the carriage assembly 22 as herein described. The side frame members 34, 36 are respectively provided with inner surfaces 40, 42 adjacent the open interior 38. A plurality of carriage brackets 44, 46, each having a C-shaped cross-section opening toward the open interior 38, are fastened to the inner surfaces 40, 42 of the side frame members 34, 36, respectively.

The frame 20 includes a shelf 48 secured to the side frame members 32, 34, and, as further discussed herein, various components of the drive assembly 26, the vacuum assembly 28, etc. can be securingly seated upon the shelf 48. The frame 20 is preferably sized and dimensioned such that the endless belt 16 of the portable food processing assembly line 14 can be positioned below the open interior 38 to receive planar food products dispensed downwardly by the carriage assembly 22. However, as indicated above, the frame 20 can be sized and dimensioned for use and/or mounting with any structure suitable for receiving dispensed planar food product.

A cable assembly 50 is mounted about ends of the carriage bracket 46. More particularly, the cable assembly 50 includes a first wheel 52, which is secured to the inner surface 42 of the side frame member 36 proximal the end frame member 32, a second wheel 54, which is secured to the inner surface 42 opposite the end frame member 32, and a metal cable 56 that is secured to the inner surface 42 proximal the first wheel 52, extends about the first wheel 52, securingly wraps about the drum 70 of the carriage assembly 22, extends about the second wheel 54 opposite the end frame member 32, and is secured to the inner surface 42 proximal the second wheel 54. As will be discussed with further detail below, the drive assembly 26 induces reciprocating linear motion of the carriage assembly 22 along the carriage brackets 44, 46, and a purpose of the cable assembly 50 is to induce rotational motion of the drum 70 in response to such linear motion. However, any suitable means for inducing rotational motion can be utilized, such as providing the drum 70 and the frame 20 with a rack and pinion configuration.

Figure 5:
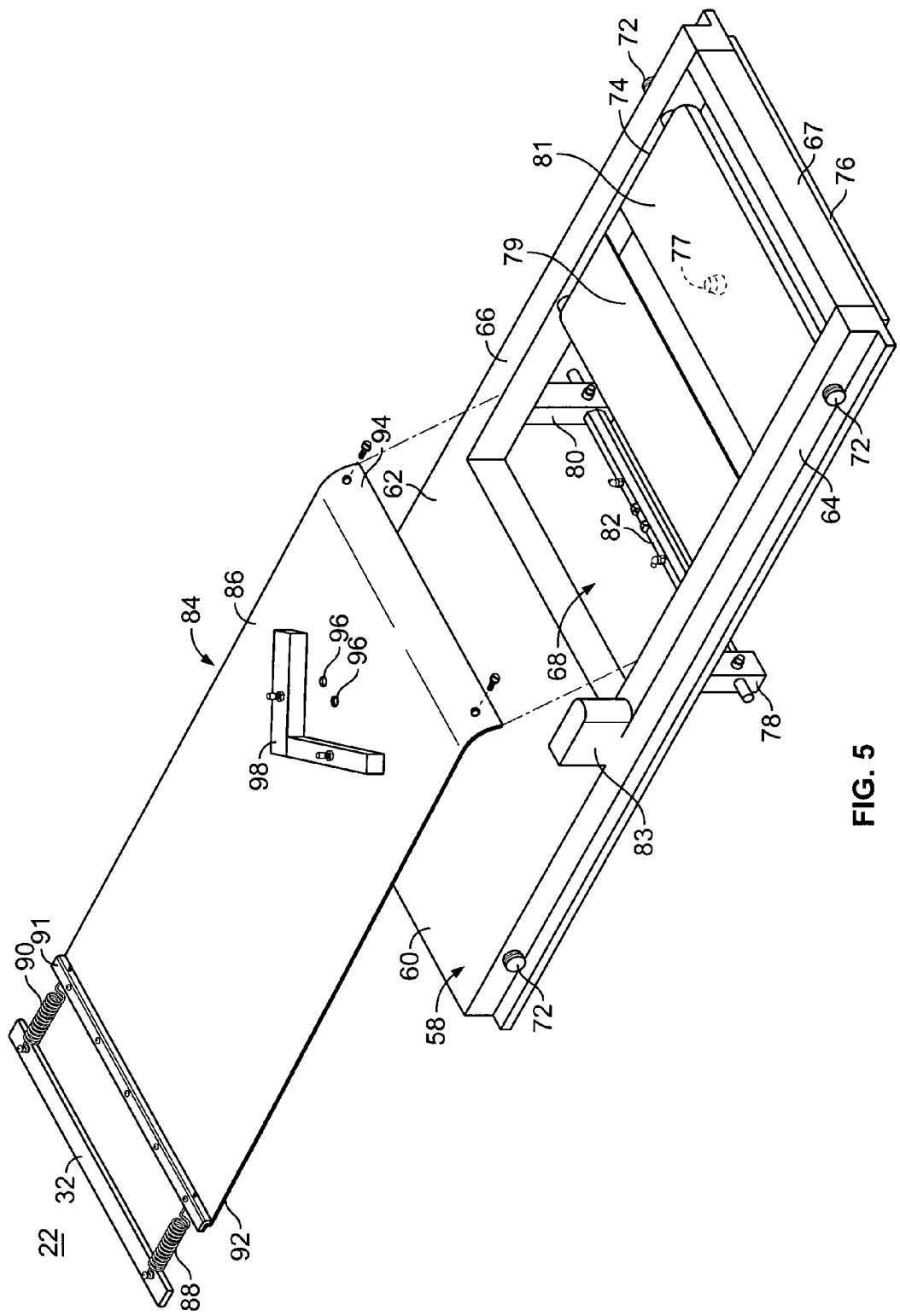
FIG. 5 is a left side perspective view showing the carriage assembly of FIG. 4 without the drum.

Referring to FIGS. 4 and 5, the carriage assembly 22 includes a first plate 58, which has a first side 60 proximal the end frame member 32 and a second side 62 opposite thereto. The carriage assembly 22 further includes a plurality of extensions 64, 66 that extend from the second side 62 of the first plate 58, as well as a carriage end member 67 extending between the extensions 64, 66 at ends thereof. The first plate 58, the extensions 64, 66, and the carriage end member 67 are sized and dimensioned to fit within the open interior 38 of the frame 20, and a plurality of rollers 72 are disposed on outer surfaces of the first plate 58 and the extensions 64, 66, which are received by the carriage brackets 44, 46. A support means, such as a belt assembly 74 is positioned between the extensions 64, 66 opposite the first plate 58 and proximal the carriage end member 67. A gap 68 in which the drum 70 is positioned is defined between the first plate 58 and the belt assembly 74. As will be further discussed below with reference to FIGS. 12A-12F, the support means, such as the belt assembly 74, is for receiving a next bottommost member 102b of the stack 102 during rotation of the drum 70. Such support means could include any material and/or structure suitable for the purpose therefore herein described.

Figure 10:
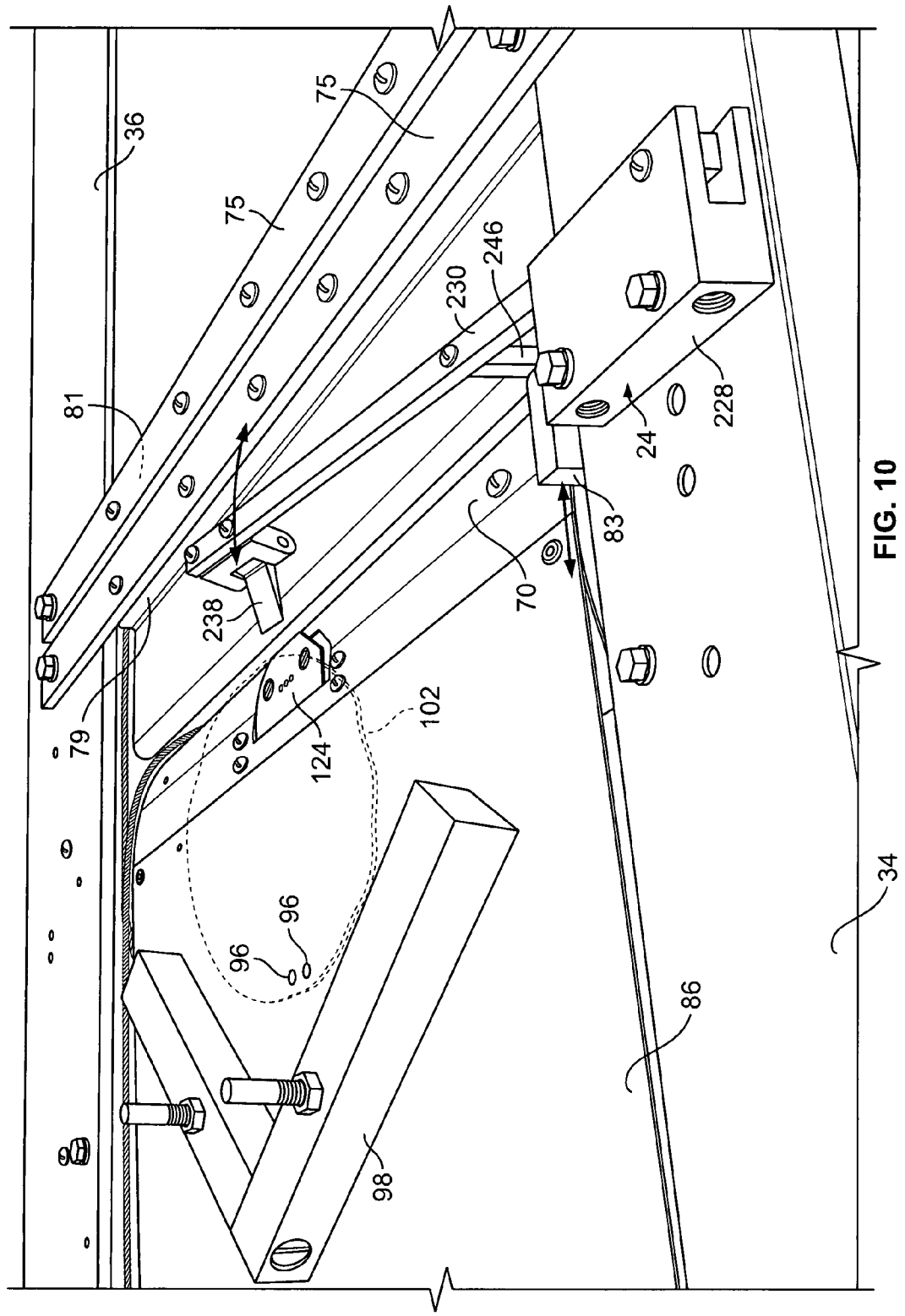
FIG. 10 is a left side perspective view of the arm assembly of FIGS. 3 and 9 shown in the disengagement position with the lip being in an open position.

The belt assembly 74 includes a vinyl belt (not designated generally) disposed about a plurality of rollers (not designated) secured to the extensions 64, 66. As shown in FIG. 10, the vinyl belt can extend to a plurality of tightening bars 75 that extend from one of the side frame member 34, 36 to the other one of the side frame member 34, 36, the purpose of which being to inhibit the formation of slack in the vinyl belt. The vinyl belt has a plurality of ends 79, 81, each of which are each secured to one of the tightening bars 75. The vinyl belt is free to rotate about the rollers when the carriage assembly 22 reciprocates with respect to the frame 20 and the bars 75 secured thereto. In this regard, as will be discussed below with reference to FIGS. 12A-12F, the belt can be "unrolled" beneath the stack 102 of tortillas.

A second plate 76 is positioned below the belt assembly 74 and is secured to the extensions 64, 66 and the carriage end member 67. The first plate 58, the extensions 64, 66, the carriage end member 67, and the second plate 76 are formed of a rigid material, such as metal. As further discussed below, the linkage of the drive assembly 26 is preferably secured to a first ball joint 77 that extends downwardly from the second plate 76, such that the drive assembly 26 can induce linear reciprocation of the carriage assembly 22.

A plurality of mounting blocks 78, 80 are respectively secured to and extend downwardly from the extensions 64, 66 at a point therealong proximal the gap 68. The mounting blocks 78, 80 receive a drum axle 82 of the drum 70 at an end of the mounting blocks 78, 80 opposite the extensions 64, 66, and caps. As will be described with further detail below with reference to FIGS. 6-8, the mounting blocks 78, 80 and the drum axle 82 are at least partially hollow for communicating negative pressure, e.g., a vacuum, therethrough. Also discussed with further detail below, a plurality of caps 187 are provided for sealing hollow ends of the drum axle 82.

The carriage assembly 22 is provided with a first protuberance 83, which extends upwardly from the second side 62 of the first plate 58 proximal the extension 64. As will be further discussed below with reference to FIG. 9, the first protuberance 83 is sized, shaped, and positioned, such that, when the carriage assembly 22 reciprocates, the first protuberance 83 alternates between pushing and releasing a second protuberance 246 of the arm assembly 24 to induce motion of the arm assembly 24 between first and second orientations thereof.

Figure 6:
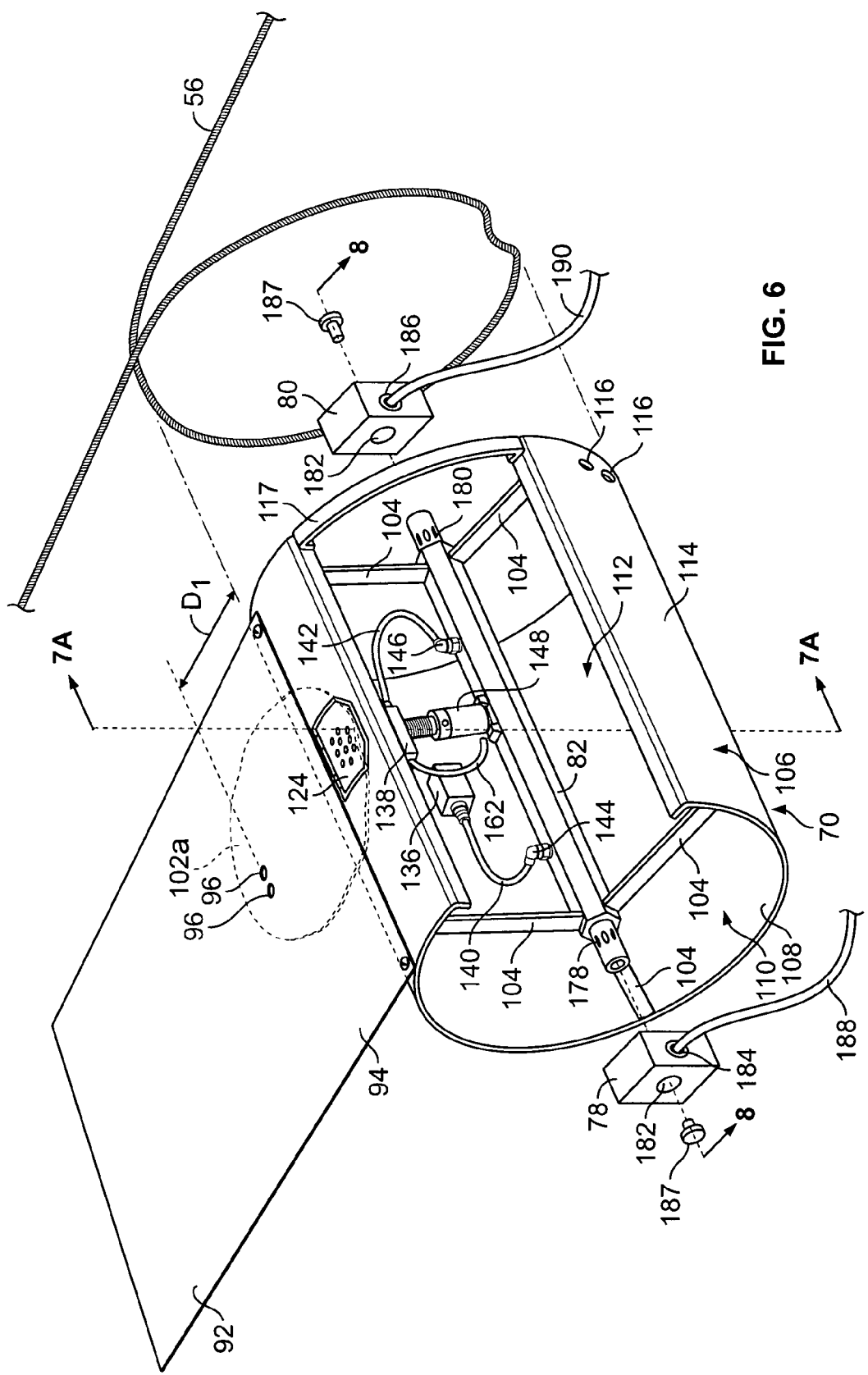
FIG. 6 is a left side perspective view of the cable assembly of FIG. 3 together with a belt of the first belt assembly, the drum, and the mounting blocks of FIG. 4.

Referring to FIGS. 4-6, the carriage assembly 22 includes a belt assembly 84 secured to the end frame member 32 of the frame 20 and the drum 70. For example, the assembly 84 includes a belt 86 and further includes a plurality of spring mounts 88, 90 (and a reinforcement 91 therefor) for securing a first end 92 of the belt 86 of the end frame member 32 so as to provide shock absorbing qualities. A second end 94 of the belt 86 opposite the first end 92 thereof is secured to the drum 70 so as to be flush and forming a continuous surface therewith. The belt 86 has a plurality of holes, referenced herein as belt holes 96, that are formed therethrough proximal the second end 94. The belt holes 96 are spaced apart from the second end 94 of the belt 86 by a distance $D_1$.

A V-shaped alignment device 98 can rest atop the belt 86 and opens in a direction toward the drum 70. An area above the belt 86 for receiving a stack 102 of planar food products is referenced herein as a receiving area 100. Although the belt holes 96 shall be discussed with further detail below, it is noted that the belt holes 96 are in fluid communication with the vacuum assembly 28 via the drum 70, drum axle 82, and mounting blocks 78, 80 such that suction can be applied to a bottommost tortilla 102a of the stack 102 via the belt holes 96, to allow the bottommost tortilla 102a to be forced against the drum 70 by virtue of a pressure differential with the atmosphere.

Figure 7A:
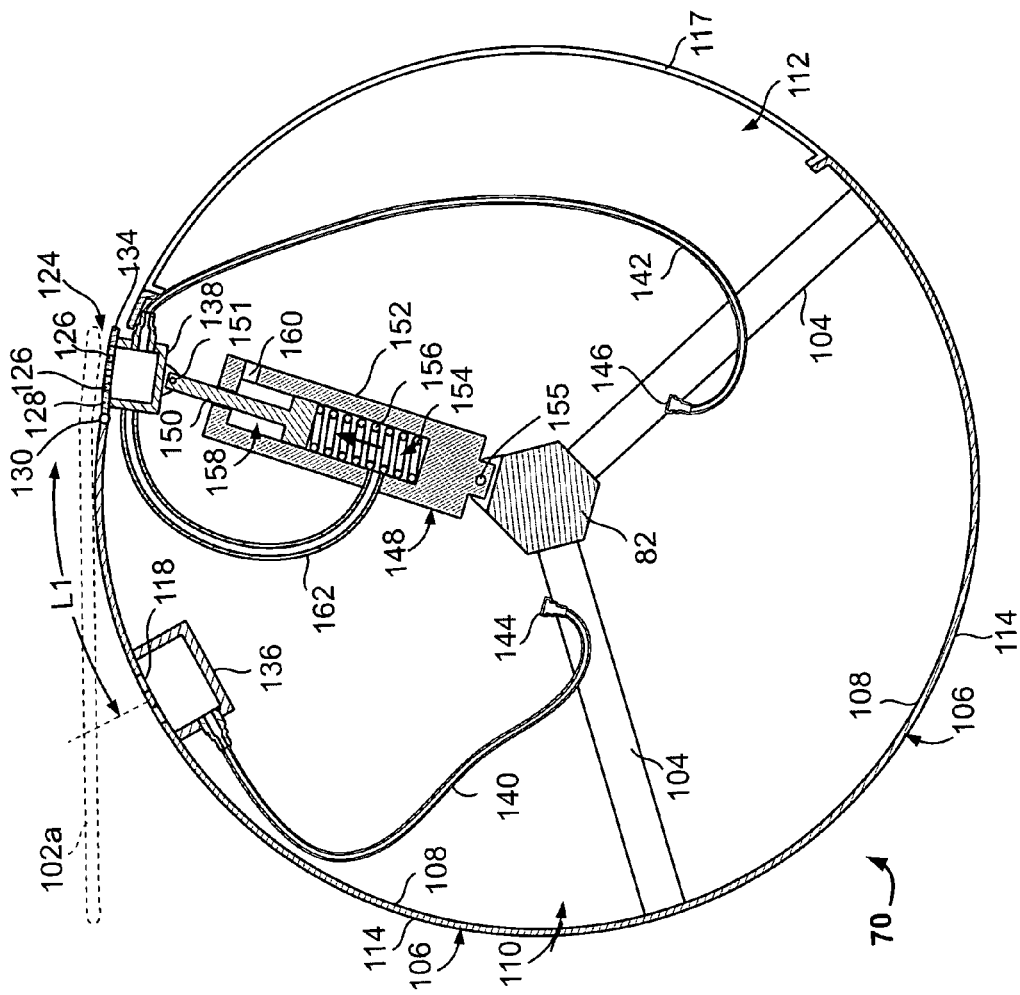
FIG. 7A is a cross-sectional view of the drum taken along section line 7A-7A of FIG. 6 with a suction lip of the drum being shown in an open position.
Figure 7B:
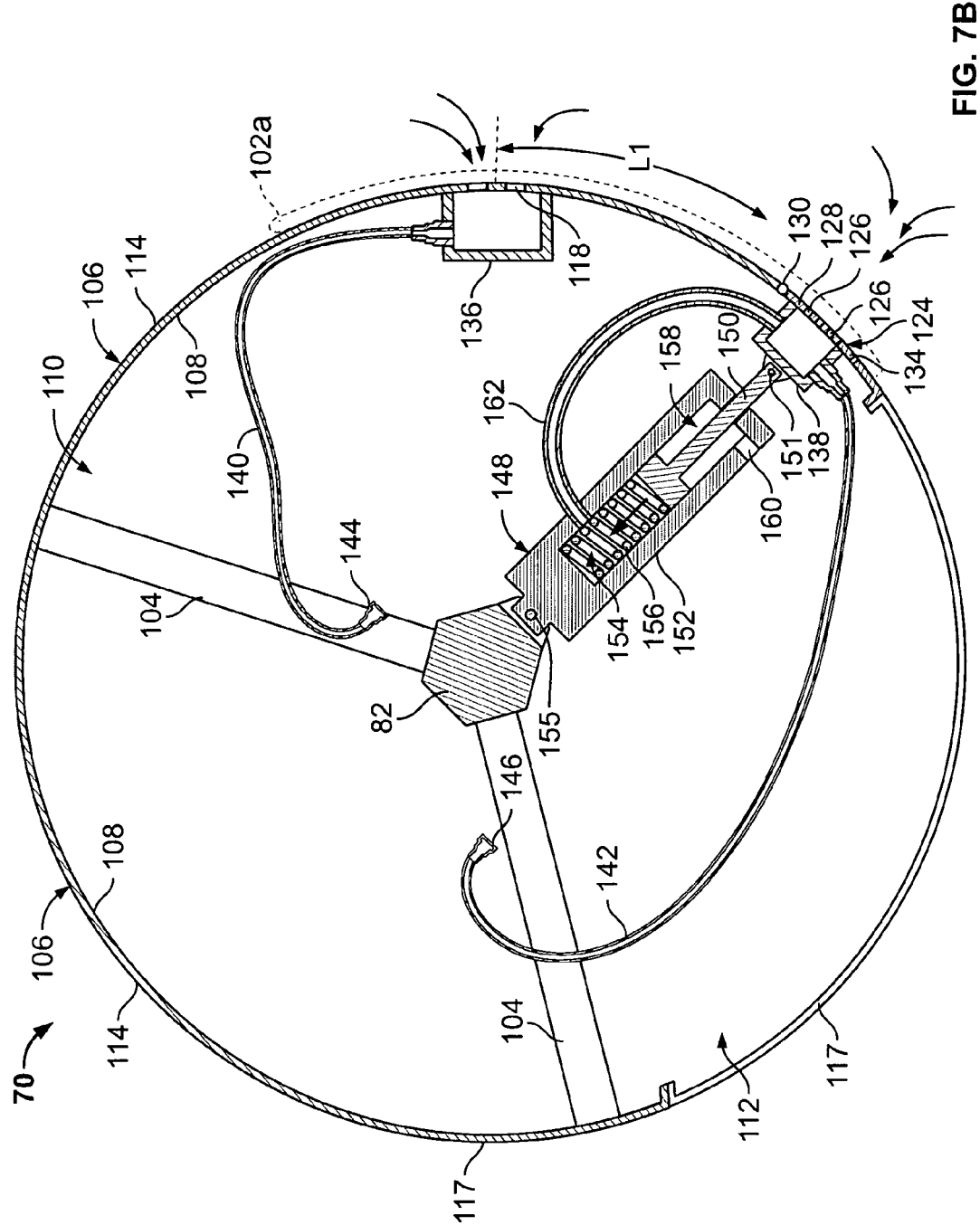
FIG. 7B is a cross-sectional view of the drum similar to FIG. 7A, with the drum having been rotated about one hundred thirty-five degrees clockwise and with the suction lip of the drum in the closed position.
Figure 8:
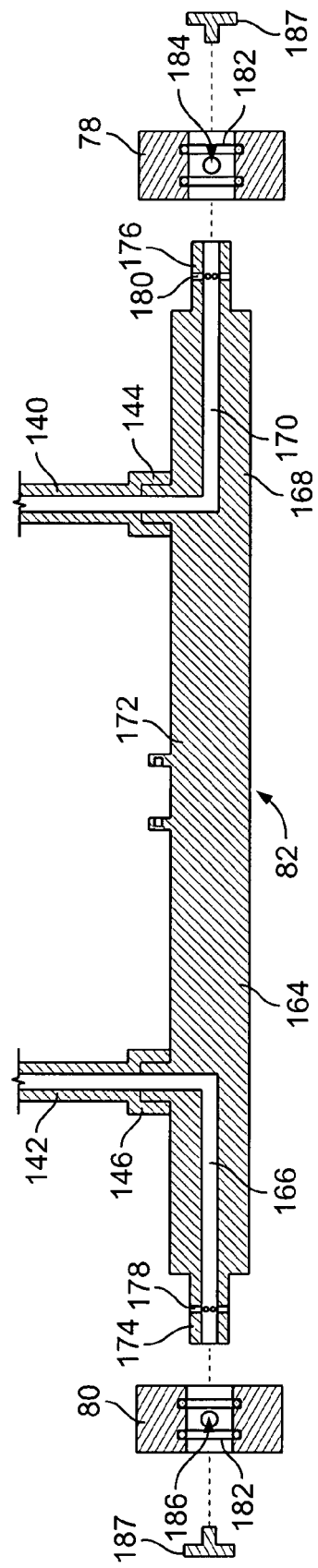
FIG. 8 is a cross-sectional view of the drum axle and the mounting blocks taken along section line 8-8 of FIG. 6.

Referring to FIGS. 6-8, the drum 70 includes a plurality of spokes 104 extending radially from the drum axle 82 and further includes a substantially cylindrical wall 106 extending at least partially about the drum axle 82 and secured thereto by the spokes 104. The substantially cylindrical wall 106 has an inner surface 108 defining a chamber for receiving components of the vacuum assembly 28, and such chamber is referenced herein as a component chamber 110. The substantially cylindrical wall 106 preferably defines an open area 112 through which components can be positioned within the component chamber 110. An outer surface 114 is disposed on the substantially cylindrical wall 106 opposite the inner surface 108.

The substantially cylindrical wall 106 preferably has a plurality of holes, referenced herein as cable holes 116, formed therethrough at an end of the wall 106 proximal the cable assembly 50. In this regard, as the metal cable 56 wraps tightly around the drum 70, the metal cable 56 extends through one of the cable holes 116 into the component chamber 110 and back out of the component chamber 110 through the other one of the cable holes 116. Due to the tension in the metal cable 56 and the tight winding about the outer surface 114 of the wall 106 of the drum 70, slippage is inhibited between the cable 56 and the substantially cylindrical wall 106, such that the metal cable 56 is virtually fixed to the drum 70 proximal the cable holes 116. It is contemplated that structures can be provided with the drum 70 for aligning the metal cable 56 as it wraps about the drum 70. For example, as shown in FIG. 6, a guide 117 having an arc shape is provided in the open area 112 in circumferential alignment with the cable holes 116. Additional and/or alternative structure can be disposed on the outer surface 114 of the substantially cylindrical wall 106 for aligning the metal cable 56 as it wraps about the outer surface 114.

Referring to FIGS. 7A and 7B, the substantially cylindrical wall 106 defines one or more holes therethrough, which are referenced herein as rear suction holes 118. There is an arc length $L_1$ between the rear suction holes 118 and the position where the second end 94 of the belt 86 is secured to the wall 106 of the drum 70. In this regard, the arc length $L_1$ is about equal to the distance $D_1$, such that the belt holes 96 move into alignment with the rear suction holes 118 during rotation of the drum 70, thereby allowing communication of negative pressure therethrough for securing the bottommost tortilla 102a against the belt 86 as it rotates with the drum 70.

Figure 9:
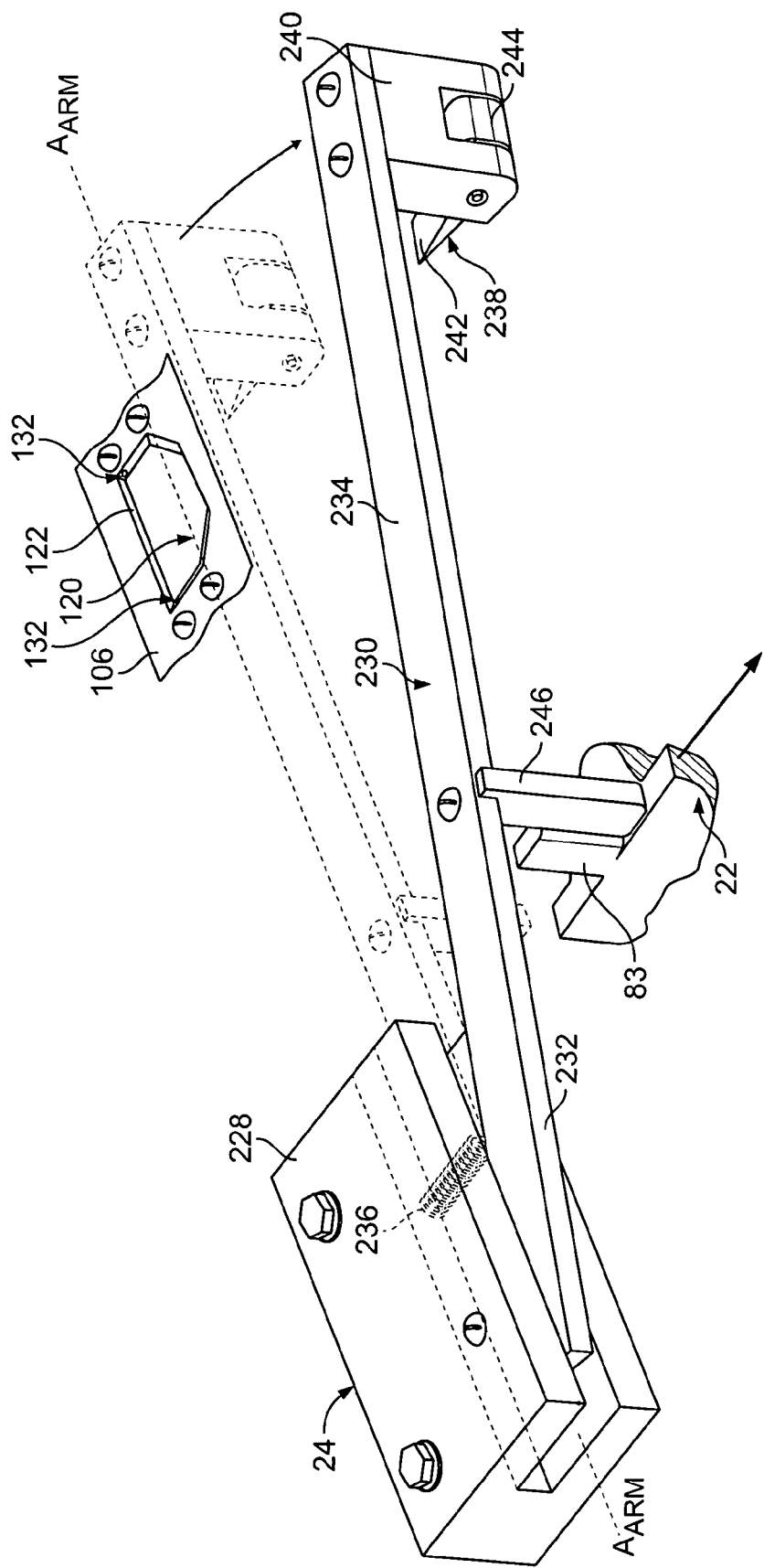
FIG. 9 is an enlarged view of the arm assembly of FIG. 3 and an opening in which the suction lip sits, the suction lip having been removed to show an edge defining such opening, and the arm assembly being shown to be pivotally movable between an engagement position proximal the suction lip of the drum and a disengagement position distal from the suction lip.

Referring to FIGS. 7A, 7B, and 9, the substantially cylindrical wall 106 has an opening 120 defined therethrough by an edge 122. A lip, which is referenced herein as a suction lip 124, is disposed within the opening 120. One or more holes, which are referenced herein as forward suction holes 126, are formed through the suction lip 124. The suction lip 124 has a first end 128 with an axle, which is referenced herein as a lip axle 130, extending from opposing sides of the first end 128 of the suction lip 124. The edge 122 has opposing depressions 132 formed therein for receiving the lip axle 130 so as to allow the suction lip 124 to pivot. The suction lip 124 has a second end 134 opposite the lip axle 130 of the first end 128, which, as will be further discussed below, can pivot about the lip axle 130 from an open position, where at least a portion of the lip 124 is displaced from the substantially cylindrical wall 106, to a closed position, where the suction lip 124 is substantially flush with the substantially cylindrical wall 106. In some embodiments of the invention, the suction lip 124, when in the open position, can be characterized as extending tangentially with respect to the substantially cylindrical wall 106.

Referring to FIGS. 7A and 7B, a plurality of hollow casings, which are referenced herein as a rear hollow casing 136 and a forward hollow casing 138 are secured in fluid communication with the rear suction holes 118 and the forward suction holes 126, respectively. More particularly, the rear hollow casing 136 is secured against the inner surface 108 of the wall 106 in fluid communication with the rear suction holes, and the forward hollow casing 138 is secured against the suction lip 124 in fluid communication with the forward suction holes 126. A first fluid conduit 140 and a second fluid conduit 142, e.g., tubes, are secured to and in fluid communication with the rear and forward hollow casings 136,138, respectively. The first and second tubes 140, 142 terminate at connectors 144, 146, respectively, which, as further discussed below with reference to FIG. 8, are secured to the partially hollow drum axle 82 for fluid communication therewith.

An air cylinder 148 for reciprocating the suction lip 124 is mounted on the drum axle 82. More particularly, a first pivot 151 is provided to pivotally secure a first end of the air cylinder 148 to the forward hollow casing 138, and a second pivot 155 is provided to pivotally secure a second end of the air cylinder 148 opposite the first end thereof to the axle 82. The air cylinder 148 is configured to be operational between a extended position, in which the air cylinder 148 pushes the suction lip 124 into the open position (by pushing the forward hollow casing 138, for example), and a distended position, in which the air cylinder 148 pulls the suction lip 124 into the closed position (by pulling the forward hollow casing 138, for example). FIG. 7A shown an exemplary instance of the extended position of the air cylinder 148 and the open position of the suction lip 124, while FIG. 7B shows an exemplary instance of the distended position of the air cylinder 148 and the closed position of the suction lip 124.

It is contemplated that any suitable air cylinder can be employed by the present invention, and that the air cylinder can be secured to the suction lip 124, directly or indirectly, and by any suitable means known in the art. For example, it is contemplated that an air cylinder made by Bimba Manufacturing Company can be used, such as a Reverse Single Acting Cylinder No. 01 1/2-RP. It is contemplated that the air cylinder can be directly secured to the suction lip in addition to or as an alternative to indirectly securing the air cylinder to the suction lip via the forward hollow casing 138. A conduit can be provided for fluid communication between the inside of the forward hollow casing 138 and the air cylinder, such that the application of a vacuum to the second fluid conduit 142 by the vacuum assembly 28 "sucks" the bottommost tortilla 102a of the stack 102 against the forward suction holes 126 to close same, thereby permitting further communication of the vacuum to the air cylinder to induce the air cylinder to move to its second position closing the suction lip 124.

Although the construction of air cylinders vary and depend upon the desired characteristics thereof, a sample air cylinder 148 is shown in FIGS. 7A and 7B. As shown, the air cylinder 148 is connected via pivots 151, 155 to the forward follow casing 138 and drum axle 82 respectively. For example, it is shown that the air cylinder 148 can include a piston 150 in mechanical communication with the suction lip 124 via the forward hollow casing 138, and can further include a vacuum chamber 152 receiving the piston 150. The piston 150 partitions the vacuum chamber 152 into a first chamber 154 having a compression spring 156 positioned therein and a second chamber 158 provided with a hole 160 for communication with the atmosphere. Elastomeric O-rings (not shown) and other suitable devices can be provided to facilitate formation of suitable seals.

The biasing force of the compression spring 156, in the absence of an opposing force of greater magnitude, extends the piston 150 with respect to the vacuum chamber 152, such that the air cylinder 148 is in the extended position, thereby pushing the forward follow casing 138 and the suction lip 124 into the open position (as shown in FIG. 7A). A third fluid conduit 162 is provided with a first end in fluid communication with the forward hollow casing 138 and a second end in fluid communication with the first chamber 154, such that the first chamber 154 of the air cylinder 148 is in fluid communication with the forward hollow casing 138. In this regard, when suction is applied by the vacuum assembly 28 to the forward follow casing 138 and the forward vacuum holes 126 have been enclosed by the bottommost tortilla 102a in the stack 102, the vacuum is further delivered to the first chamber 154 of the air cylinder 148. Because the second chamber 158 communicates with atmosphere via the hole 160, it is contemplated that a pressure gradient (force) results that is greater than the biasing force of the compression spring 156, thereby forcing the piston 150 into the distended position, which pulls the forward hollow casing 138 and the suction lip 124 into the closed position (as shown in FIG. 7B).

As another example of linkage between the air cylinder and the suction lip 124, it is contemplated that the piston 150 of the air cylinder 148 can extend through a sealed opening formed in the forward hollow casing 138 to securingly link to the suction lip 124 (not shown). However, it is not required that the air cylinder 148 extend into the forward hollow casing 138 in order to contact the suction lip 124. Rather, as stated above, the air cylinder can link to the lip 124 at a position adjacent to the forward hollow casing 138 or, as shown in FIGS. 7A and 7B, can push and pull at the suction lip 124 by having the forward hollow casing 138 secured to the suction lip 124 and by pushing and pulling the forward hollow casing 138.

Referring to FIGS. 5-8, the connectors 144, 146 of the first and second fluid conduits 140, 142 secure the rear and forward hollow casings 136, 138 in fluid communication with the drum axle 82. The drum axle 82 has a first midsection 168 with a first bore 170 formed therethrough, such as by drilling, and a second midsection 164 with a second bore 166 formed therethrough, such as by drilling, that is separated from the first bore 168 by a partition 172 formed therebetween. In this regard, the connector 144 of the first fluid conduit 140 is secured to the first midsection 168 to provide fluid communication between the rear hollow casing 136 and the first bore 170. Similarly, the connector 146 of the second fluid conduit 142 is secured to the second midsection 164 to provide fluid communication between the forward hollow casing 138 and the second bore 166.

The first and second midsections 164,168, have a first radius, and first and second hollow tubular ends 174, 176 are provided with a second radius less than this first radius. The first hollow tubular end 174 extends from the second midsection 164 and is in fluid communication therewith, and the second hollow tubular end 176 extends from the first midsection 168 and is in fluid communication therewith. A first plurality of radial holes 178 are formed circumferentially about the first hollow tubular end 174, and a second plurality of radial holes 180 are formed circumferentially about the second hollow tubular end 176.

The drum axle 82 is in fluid communication with the vacuum assembly 28 via the mounting blocks 78, 80. For example, each one of the mounting blocks 78, 80 defines a bore 182 therethrough for receiving the first and second hollow tubular ends 174, 176. The mounting block 78 has a first air passage 184 that extends through to the respective bore 182, thereby being in fluid communication with the first midsection 168 of the drum axle 82 via the first plurality of radial holes 180. Similarly, the mounting block 80 has a second air passage 186 that extends through to the respective bore 182, thereby being in fluid communication with the second section 164 of the drum axle 82 via the second plurality of radial holes 178. Each one of the mounting blocks 80, 82 include a plurality of internal grooves (not designated) offset from the corresponding air passage 186, 188, and further include elastomeric O-rings (not designated) positioned within said grooves for forming a seal to inhibit escape of air through the bores 82. Caps 187 are also provided to enclose the ends 174, 176 within the bores 182.

As shown in FIG. 6, primary suction lines 188, 190 extend from the air passages 184, 186, respectively, to the vacuum assembly 28. By channeling the path of fluid through the mounting blocks 78, 80 in this regard, the risk is minimized of having conduits within the chamber 110 tangle as the drum 70 rotates.

Referring to FIG. 3, the vacuum assembly 28 shall now be discussed with further detail. The vacuum assembly 28 includes a source of positively pressurized air (not shown) provided through a source tube 192 to a solenoid valve 194, and the solenoid valve 194 is in electrical communication with first and second proximity sensors 196, 198. As will be further discussed below, the solenoid valve 194 alternates between allowing and inhibiting the passage of the positively pressurized air therethrough in accordance with electrical signals provided by the proximity sensors 196,198.

The vacuum assembly 28 further includes first and second pumps 200, 202 and first and second pump conduits 204, 206 for communicating the positively pressurized air from the solenoid valve 194 to the first and second pumps 200, 202, respectively (when the solenoid valve 194 permits the passage of such pressurized air). The first and second pumps 200, 202 allow passage of the pressurized air back through the return lines 208, 210, respectively, but, in doing so, the first and second pumps 200, 202 induce a venturi effect providing a suction vacuum, e.g., negative pressure, in the primary suction lines 188, 190, respectively. As indicated above, it is the presence of suction through the primary suction lines 188, 190 that causes the bottommost tortilla 102a to be secured against the rear and forward vacuum holes 118, 126 and that causes the air cylinder 148 to move the suction lip 124 into its closed position (such as by having the forward hollow casing 138 secured to the suction lip 124 and by pulling on the forward hollow casing 138).

Referring to FIG. 4, the drive assembly 26 shall now be discussed with further detail. The drive assembly 26 includes a motor for driving the carriage, which is referenced herein as a carriage motor 212. The carriage motor 212 is preferably a continuously variable speed motor, and the speed thereof can be increased and or decreased via the electronic control assembly 30 in communication therewith. A horizontal shaft 214 of the carriage motor 212 is in communication with a reduction box 216 having a vertical shaft 218 extending therefrom. In response to activation of the carriage motor 212, the vertical shaft 218 rotates a first radial member 220 extending radially therefrom. The first radial member 220 has a metal flange 222 for detection by the proximity sensor 198 once per revolution of the first radial member 220, and such metal flange 222 shall be discussed further below with reference to FIG. 12E. The first radial member 220 forms a second ball joint 224 with a second radial member 226 extending radially therefrom. The second radial member 226 forms the first ball joint 77 with the second plate 76 of the carriage assembly 22. In this regard, activation of the carriage motor 212 causes the second radial member 226 to alternatively "push and pull" the carriage assembly 22, thereby causing the carriage assembly 22 to reciprocate linearly along the brackets 44, 46. As discussed above, the reciprocation of the carriage assembly 22, together with the cable assembly 50, causes the drum 70 to alternate between clockwise motion and counterclockwise motion.

Referring to FIGS. 3, 4, and 9-11 further discussion of the arm assembly 24 shall now be made. The arm assembly 24 includes a base 228 fixed to the frame 20 at a position aligned with the second end 94 of the belt 86 along an axis $A_{ARM}$. The arm assembly 24 further includes an arm 230 having a first side 232 and a second side 234 opposing the first side. The arm 230 is pivotally secured to the base at the first side 232 and biasing means, such as a spring 236, is secured to the first side 232 and the base 228 to bias the arm into alignment with the axis $A_{ARM}$.

The second side 234 of the arm 230 is provided with a toe 238 and a mount 240 therefor. The toe 238 has a leading edge 242 for separating the bottommost tortilla 102a in the stack 102 from the next-bottommost tortilla 102b in the stack 102. The toe 238 preferably has a substantially triangular cross-section with a flared section 244 tapering toward the leading edge 242. The toe 238 is mounted at the flared section 244 to the mount 240, which is fastened to the arm 230 at the second side 234 thereof.

The arm assembly 24 is provided with a second protuberance 246, which is secured to and extends downwardly from the arm 230 proximal the extension 64 of the carriage assembly 22. The second protuberance 246 is sized, shaped, and positioned, such that, when the carriage assembly 22 reciprocates, the second protuberance 246 is respectively pushed (urged) and released by the first protuberance 83 to move the arm assembly 24 between a first position, referenced herein as a disengagement position, and a second position, referenced herein as an engagement position.

Referring to FIG. 10, an example disengagement position of the arm assembly 24 is shown. In the disengagement position, the carriage assembly 22 has reciprocated to a first position relative to the frame 20, such that the first protuberance 83 of the carriage assembly 22 has urged the second protuberance 246 of the arm assembly 24, thereby rotating the arm 230 and disengaging the toe 238 from a stack 102 positioned at the receiving area 100 over the suction lip 124.

Figure 11:
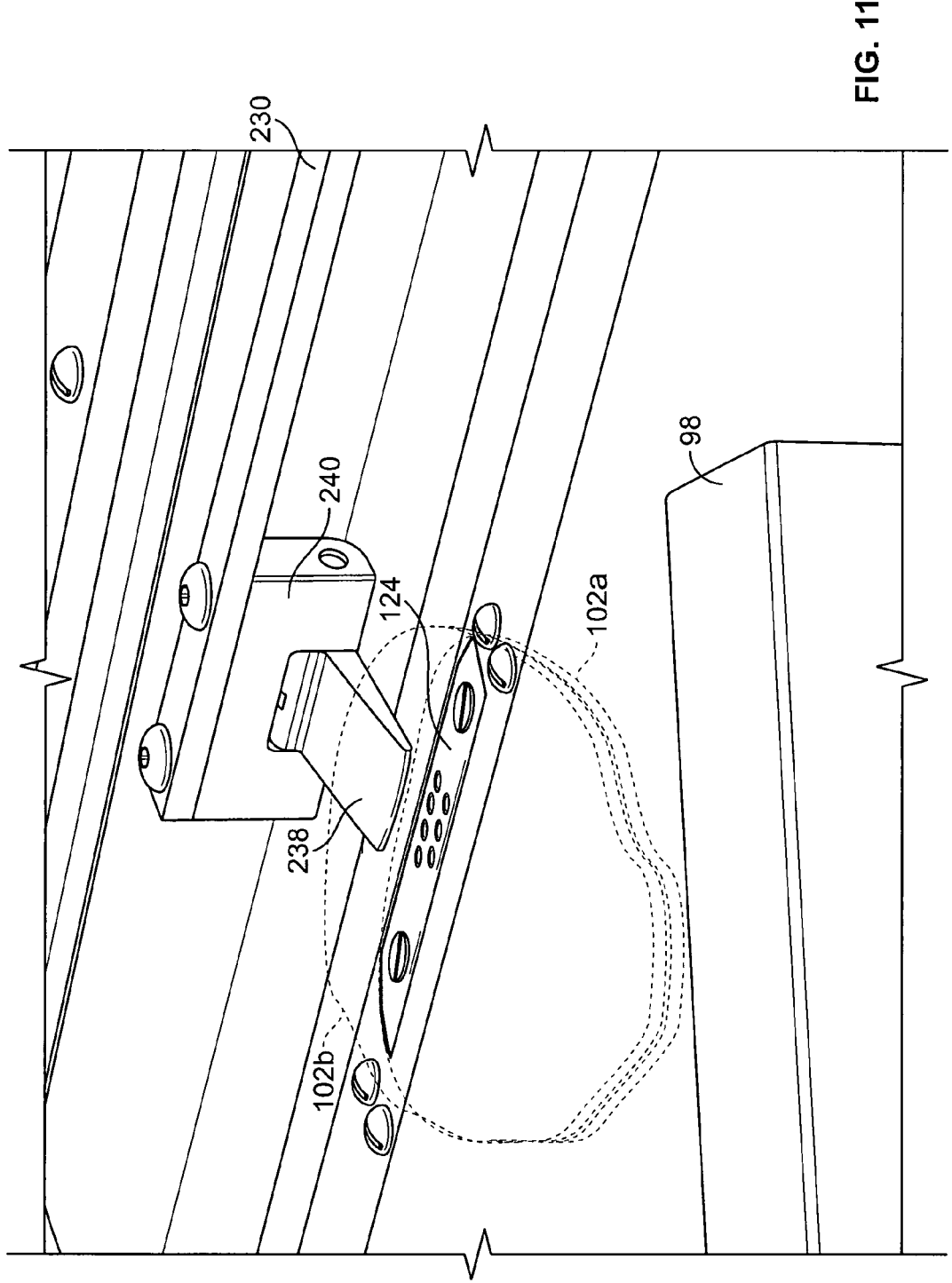
FIG. 11 is a left side perspective view of the arm assembly of FIGS. 3 and 9 shown in the engagement position with the lip being in a closed position.

Referring to FIG. 11, an example engagement position of the arm assembly 24 is shown. In the engagement position, the carriage assembly 22 has reciprocated to a second position relative to the frame 20, such that the first protuberance 83 of the carriage assembly 22 is spaced apart from the second protuberance 246 of the arm assembly, thereby allowing the spring 236 to maintain the arm 230 into alignment with the axis $A_{ARM}$, and causing the leading edge 242 to drive the toe 238 above the bottommost tortilla 102a and the next bottommost tortilla 102b in the stack 102. The suction lip 124, in some embodiments of the invention, attains its closed position, securing the bottommost tortilla 102a against the drum 70, just before (or otherwise contemporaneously with) the arm assembly 24 attains the engagement position, so as to cooperate with the toe 238 to separate the tortillas 102a, 120b. As the drum 70 rotates with the bottommost tortilla 102a thereagainst, the next-bottommost tortilla 102b in the stack 102 (and the stack 102 itself) rests atop the leading edge 242 of the toe 238.

Referring to FIGS. 12A-12F, exemplary operation of the destacking device 10 shall be discussed with further detail. In doing so, reference is made to the endless belt 16 of the portable food processing assembly line 14, though, as discussed above, the tortilla destacking device 10 can be used in combination with any suitable device for receiving the dispensed planar food products dispensed from the bottom of the stack 102, such as the folding platforms of a tortilla folding machine. As shall be clear to one skilled in the art, FIGS. 12A-12F are diagrammatic, with the frame 20 and other components having been removed to more clearly demonstrate operation of the carriage assembly 22, the drum 70 thereof, etc. Although reference is made below to FIGS. 12A-12F using such terms as "leftmost," "middle," "rightmost," "clockwise," and "counterclockwise," it shall be understood that the present invention is not limited by such terms, and that such term are being used merely for the sake of clarity in describing the examples of FIGS. 12A-12F.

Figure 12A:
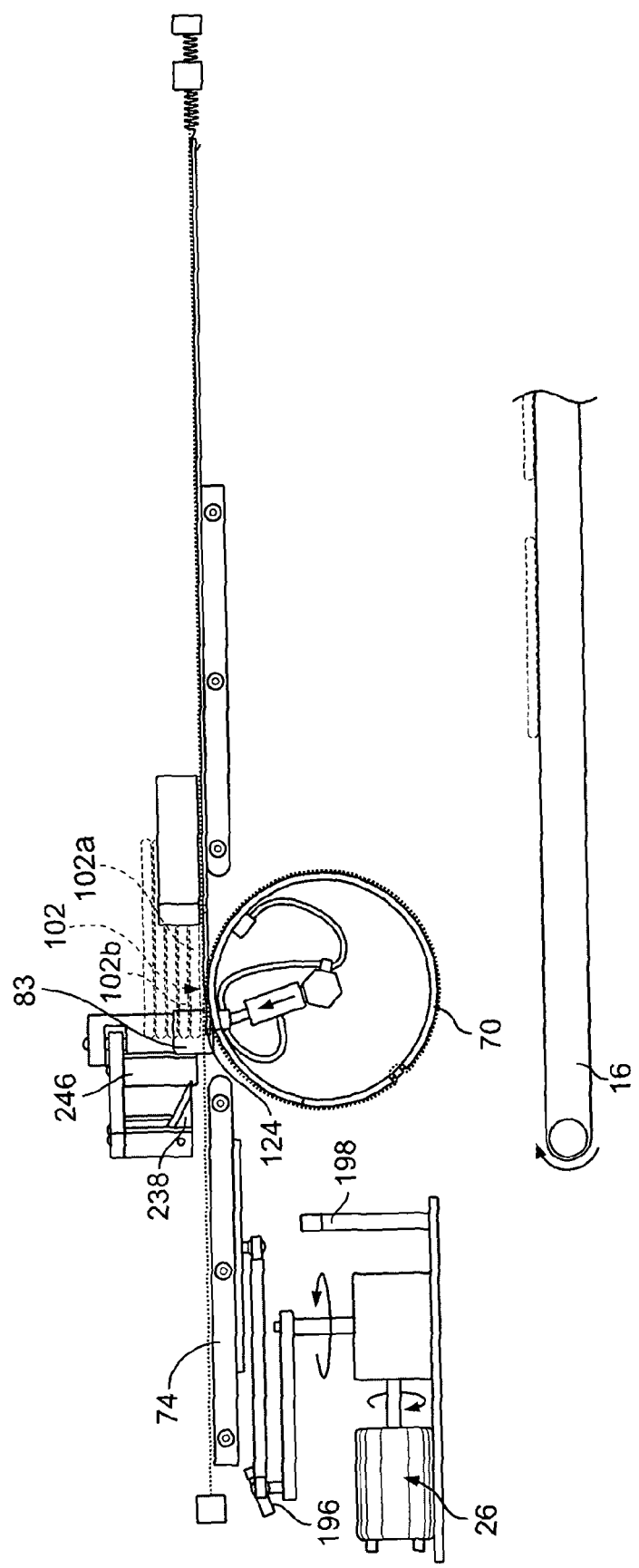

Referring to FIG. 12A, the carriage assembly 22 is almost at its leftmost position, and the first protuberance 83 of the carriage assembly 22 is shown having begun to push the second protuberance 246 of the arm assembly 24 (and thus the arm 230) into the disengagement position. The position of the aligning block 98 has been determined at least in part by the size, e.g., radius, of the planar food products. The suction lip 124 is positioned adjacent the stack 102 and directly beneath the bottommost tortilla 102a of the stack. The suction lip 124 is in its open position and the vacuum assembly 28 is delivering substantially no vacuum. However, as further discussed below with reference to FIG. 12B, as the carriage assembly 22 approaches and/or achieves its leftmost position, the first proximity sensor 196 uses inductance to identify such position and sends an electric signal to the solenoid valve 194, thereby activating the flow of positively pressurized air to the pumps 200, 202, which in turn induces a negative pressure in the primary suction lines 188, 190. The negative pressure, e.g., vacuum condition, is communicated through the mounting blocks 78, 80, the drum axle 82, and the rear and forward hollow casings 136,138.

Figure 12B:
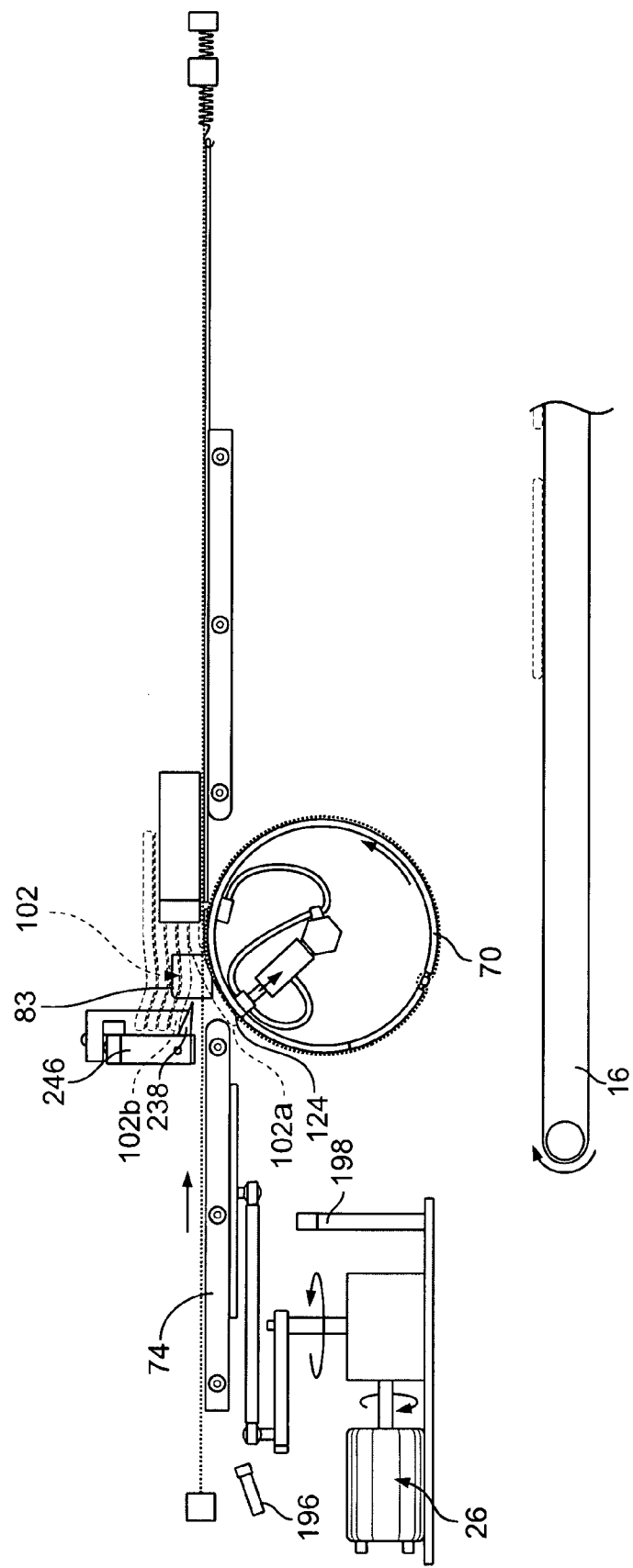

Referring to FIG. 12B, the carriage assembly 22 is shown having achieved the leftmost position and reciprocating rightward into a position between the leftmost position and a middle position. Because the cable assembly 50 is fixed both to the frame 20 and to the drum 70 proximal the cable holes 116, the drum 70 has been angularly displaced counterclockwise from the position of FIG. 12A by about forty-five degrees. Delivery of the vacuum to the forward hollow casing 138 has "sucked" at least a forward portion of the bottommost tortillas 102a against the forward vacuum holes 126 of the suction lip 124. Similarly, because the forward vacuum holes 126 are at least partially enclosed by the bottommost tortilla 102a, the vacuum condition is further delivered to the air cylinder 148, thereby inducing the air cylinder 148 to achieve a distended position, pulling the suction lip 124 into the closed position thereof (by pulling the forward hollow casing 138 secured to the suction lip 124, for example). Because the carriage assembly 22 has reciprocated away from the arm assembly 24, the first protuberance 83 of the carriage assembly 22 has been pulled out of abutting contact with the second protuberance 246 of the arm assembly 24, thereby allowing the biasing force of the spring 236 to pivot the arm 230 into the engagement position, with the leading edge 240 of the toe 238 inserted between the bottommost tortillas 102a and the next bottommost tortilla 102b. As the carriage assembly 22 reciprocates rightward and the drum 70 rotates counterclockwise, the stack 102, including the next bottommost tortilla 102b (and/or other planar food product) is positioned at least partially atop the toe 238 and above the belt assembly 74.

Referring to FIG. 12C, the carriage assembly 22 is shown having achieved a "middle position." As shown, the drum 70 has continued its counterclockwise motion, being rotated about ninety degrees with respect to the position of FIG. 12A, and a greater area of the next bottommost tortilla 102b and remaining stack 102 is above the belt assembly 74 atop the toe 238. The belt holes 96 formed in the belt 86 have come into alignment of the rear vacuum holes 118 of the drum 70, such that the vacuum condition is communicated through the rear hollow casing 136, the rear vacuum holes 118, and the belt holes 96 to secure a rear portion of the bottommost tortilla 102a against the belt 86.

Figure 12D:
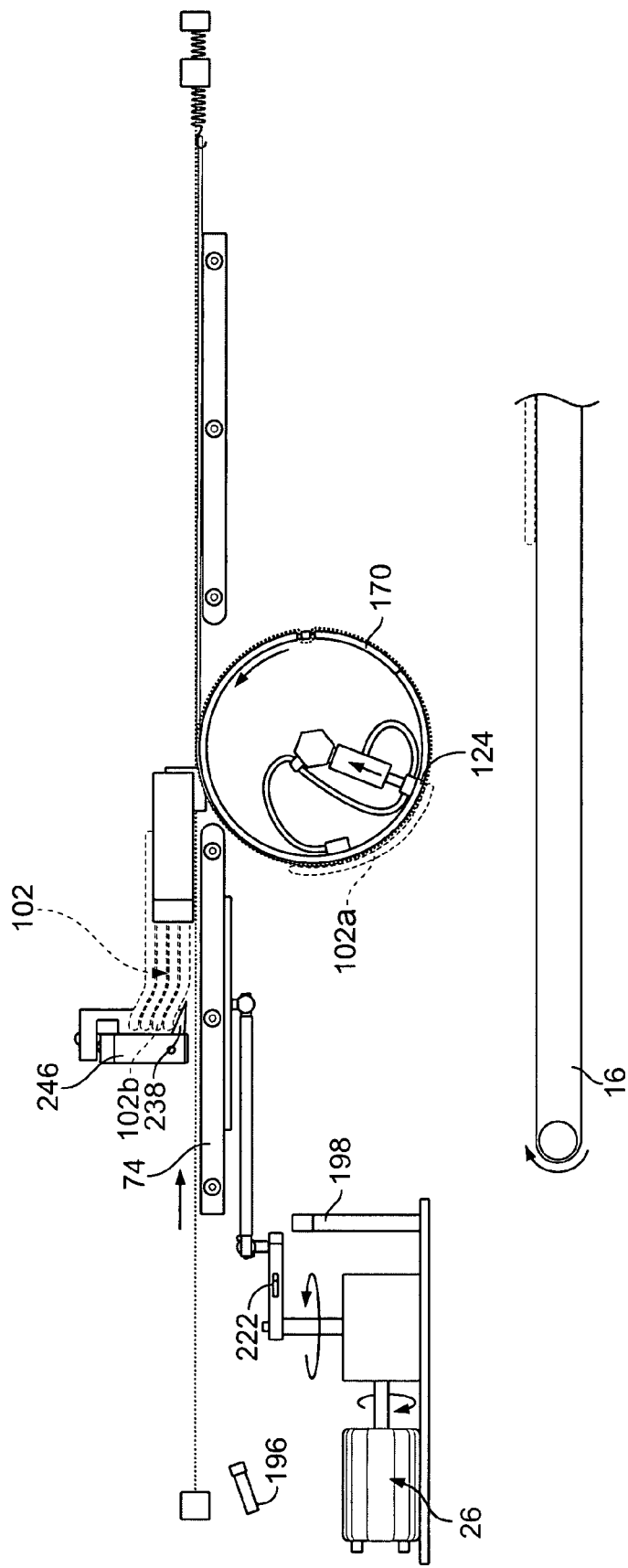

Referring to FIG. 12D, the drum 70 is shown having been further rotated counterclockwise to achieve a position between the middle position and a rightmost position, and being rotated about one-hundred thirty-five degrees with respect to the position of FIG. 12A. It can be seen that, despite the somewhat vertical orientation of the bottommost tortilla 102a, a forward portion of the tortilla 102a remains secure against the drum 70 proximal the forward vacuum holes 126. The second end 94 of the belt 86 travels with that area of the cylindrical surface 106 of the drum 70 to which the second end 94 is secured, and it is shown that a rear portion of the bottommost tortilla 102a remains secure against the second end 94 proximal the rear vacuum holes 118, despite the somewhat vertical orientation. It is also shown that the metal flange 222 of the drive assembly 26 is approaching the second proximity sensor 198.

Figure 12E:
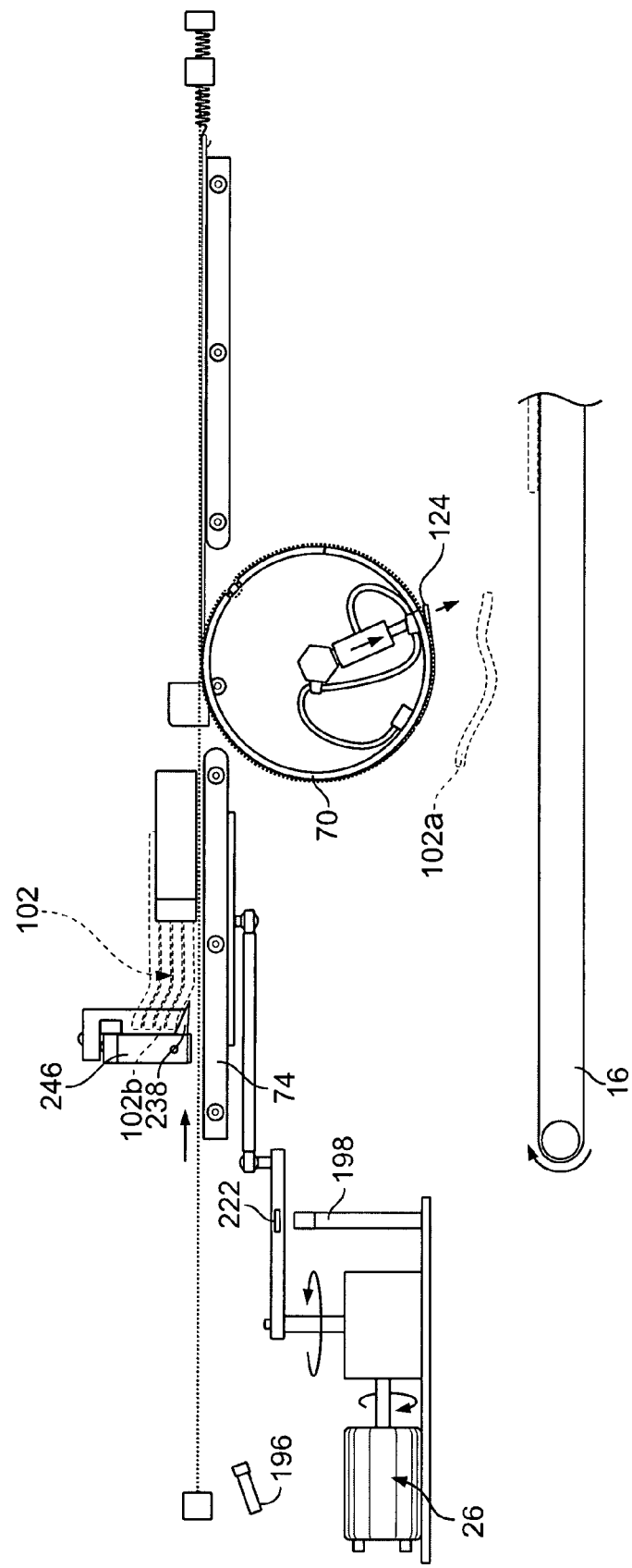

Referring to FIG. 12E, the carriage assembly 22 is shown having achieved the rightmost position, with an even greater area of the stack 102 atop the toe 238 and above the belt assembly 74. The metal flange 222 has been sensed by the second proximity sensor 198. The drum 70 has rotated counterclockwise to a position about one-hundred ninety degrees apart from the position of FIG. 12A. In response to sensing the metal flange 222, the second proximity sensor 198 has sent an electric signal to the solenoid valve 194, thereby deactivating the flow of positively pressurized air to the pumps 200, 202. The venturi effect induced by the pumps 200, 202 ceases and the negative pressure is released, thereby allowing the tortilla 102a to separate from the rear and forward vacuum holes 118, 126 by virtue of a substantially downward gravitational force. The tortilla 102a falls in a direction having a downward component, and, in some embodiments of the invention, falls atop of and is received by the endless belt 16 for delivery to an assembly line machine for further processing. In some embodiments, the tortilla 102a (or other planar food product) can fall atop a folding platform of the a tortilla folding machine. The release of the vacuum condition causes the air cylinder 148 to return to its extended position, such as by virtue of a spring biasing force, which in turn causes the suction lip 124 to move into its open position. In the embodiment of the invention shown in FIGS. 7A and 7B, the air cylinder 148 causes the suction lip 124 to move into its open position by pushing the forward hollow casing 138 secured to the suction lip 124.

Figure 12F:
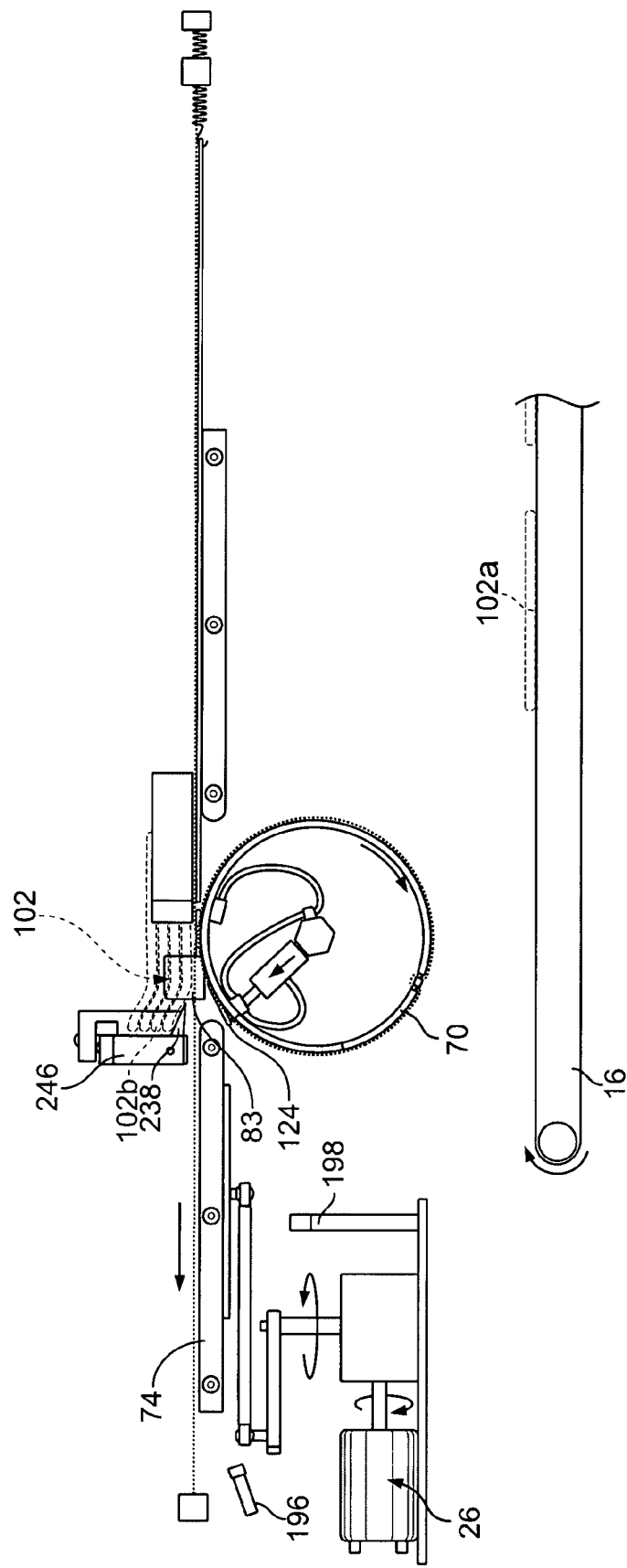

Referring to FIG. 12F, it is shown that the carriage assembly 22 begins to reciprocate back to the left and the drum 70 rotates clockwise. As the carriage assembly 22 returns to the position of FIG. 12A and the drum 70 rotates, a lesser area of the stack 102 is above the belt assembly 74. The second protuberance 246 approaches the first protuberance 83 in preparation to move the arm 230 into the disengaged position for the operation of the FIGS. 12A-12F to repeat itself, but with respect to the next bottommost tortilla 102b, the second-next bottommost tortilla, the third-next bottommost tortilla, etc.

It will be understood that the embodiments of the present invention described herein are merely exemplary and that a person skilled in the art may make many variations and modifications without departing from the spirit and scope of the invention. All such variations and modifications, including those discussed above, are intended to be included within the scope of the invention as defined in the appended claims.

What is claimed is:

1. A destacking device for dispensing planar food products, such as tortillas, from a stack bottom, comprising:
   a carriage assembly configured for linear reciprocation and including a drum having a substantially cylindrical wall and configured to, in response to linear reciprocation of said carriage assembly, rotate between a first position and a second position, said first position being adjacent a receiving area for a stack of planar food products and said second position being angularly displaced from said first position;
   a suction lip having a hole therethrough and proximal said wall, said suction lip configured to move between a closed position in which said drum is in said first position and an open position in which said drum is in said second position, said suction lip, when in said closed position, being substantially closed with respect to said wall and configured to have a negative pressure at said hole to secure against said suction lip a bottommost member of the stack, and said suction lip, when in said open position, being substantially open with respect to said wall and configured to have the negative pressure released at said hole to release from said suction lip the bottommost member in a substantially downward direction; and
   an air cylinder responsive to the presence and absence of a negative pressure to move between a distended position and an extended position, said air cylinder, when in said distended position, configured to pull said lip into said closed position, and said cylinder, when in said extended position, configured to push said lip into said open position.

2. The destacking device of claim 1 in combination with the bottommost member of the stack and a remainder of the stack.

3. The destacking device of claim 1, including a frame, and wherein said carriage assembly is configured for linear reciprocation with respect to said frame.

4. The destacking device of claim 3, including an arm assembly having a base secured to said frame, an arm extending from said base, and a toe mounted to said arm, said arm assembly being movable in response to linear reciprocation of said carriage assembly between (i) a disengagement position in which said toe is spaced apart from said suction lip, and (ii) an engagement position in which said toe is proximal said suction lip for separating the bottommost member of the stack from a next bottommost member of the stack.

5. The destacking device of claim 1, including a hollow casing secured to and in fluid communication with said suction lip, said air cylinder configured to push and pull said suction lip by being in mechanical communication with said hollow casing.

6. The destacking device of claim 5, wherein said hollow casing is in fluid communication with said air cylinder.

7. The destacking device of claim 1, including at least one pump for inducing the negative pressure when said at least one pump is activated and for releasing the negative pressure when said at least one pump is deactivated.

8. The destacking device of claim 7, including a first sensor configured to provide a first electric signal when said carriage assembly is in said first position, a second sensor configured to provide a second electric signal when said carriage assembly is in said second position, and a solenoid valve configured to activate said pump in response to said first electrical signal and to deactivate said pump in response to said second electrical signal.

9. The destacking device of claim 1 in combination with an assembly line at least partially positioned below said drum so as to receive a member of the stack dispensed from said second position of said drum.

10. A destacking device for dispensing planar food products, such as tortillas, from a stack bottom, comprising:
a frame;
a carriage assembly configured for linear reciprocation with respect to said frame and including a drum having a substantially cylindrical wall and configured to, in response to linear reciprocation of said carriage assembly, rotate between a first position and a second position, said first position being adjacent a receiving area for a stack of planar food products and said second position being angularly displaced from said first position; and
an arm assembly having a base secured to said frame, an arm extending from said base, and a toe mounted to said arm, said arm being movable in response to linear reciprocation of said carriage assembly between (i) a disengagement position in which said toe is spaced apart from said receiving area, and (ii) an engagement position in which said toe is proximal said receiving area for separating a bottommost member of the stack from a next bottommost member of the stack;
wherein said carriage assembly includes a first protuberance, and wherein said arm assembly includes a second protuberance, said arm being movable into said disengagement position when said carriage assembly reciprocates with said first protuberance abutting said second protuberance of said arm assembly.

11. The destacking device of claim 10 in combination with an assembly line at least partially positioned below said drum so as to receive a member of the stack dispensed from said second position of said drum.

12. The destacking device of claim 10, wherein said arm assembly includes a spring for biasing said arm into said engagement position.

13. The destacking device of claim 10, wherein said arm assembly includes a spring for biasing said arm into said engagement position, when said carriage assembly reciprocates to move said first protuberance away from said second protuberance.

14. A destacking device for dispensing planar food products, such as tortillas, from a stack bottom, comprising:
a frame;
a carriage assembly configured for linear reciprocation with respect to said frame and including a drum having a substantially cylindrical wall and configured to, in response to linear reciprocation of said carriage assembly, rotate between a first position and a second position, said first position being adjacent a receiving area for a stack of planar food products and said second position being angularly displaced from said first position;
a suction lip proximal said wall and having a hole therethrough for application of a negative pressure to a bottommost member of the stack, said suction lip configured to move between a closed position, in which said drum is in said first position, and an open position in which said drum is in said second position;
a vacuum assembly for having a negative pressure delivered therethrough to said hole when said suction lip is in said closed position and for having the negative pressure therethrough released when said suction lip is in said open position; and
an arm assembly having an arm movable with respect to said frame and a leading edge secured to said arm, said arm being movable into an engagement position in response to linear reciprocation of said carriage assembly, said leading edge, when said arm is in said engagement position, cooperating with said suction lip to separate at least a portion of the bottommost member of the stack from a next bottommost member of the stack;
wherein said carriage assembly includes a first protuberance, and wherein said arm assembly includes a second protuberance, said arm being movable into a disengagement position when said carriage assembly reciprocates to force said first protuberance against said second protuberance.

15. The destacking device of claim 14, wherein said arm assembly includes a spring for biasing said arm into said engagement position.

16. The destacking device of claim 14, wherein said arm assembly includes a spring for biasing said arm into said engagement position when said carriage assembly reciprocates to move said first protuberance away from said second protuberance.

17. The destacking device of claim 14 in combination with the bottommost member of the stack, the next bottommost member of the stack, and a remainder of the stack.

* * * * *